United States Patent
Kwak et al.

(10) Patent No.: US 6,639,971 B2
(45) Date of Patent: Oct. 28, 2003

(54) LIQUID CRYSTAL DISPLAY PANEL AND METHOD FOR FABRICATING THE SAME

(75) Inventors: Dong Yeung Kwak, Taegu-kwangyokshi (KR); Ki Tae Kim, Taegu-kwangyokshi (KR)

(73) Assignee: LG.Philips LCD Co., Ltd., Seoul (KR)

(*) Notice: Subject to any disclaimer, the term of this patent is extended or adjusted under 35 U.S.C. 154(b) by 37 days.

(21) Appl. No.: 10/001,792

(22) Filed: Dec. 5, 2001

(65) Prior Publication Data

US 2002/0085148 A1 Jul. 4, 2002

(30) Foreign Application Priority Data

Dec. 29, 2000 (KR) .................................. 2000-0085556

(51) Int. Cl.$^7$ ............................................. G02F 1/1336
(52) U.S. Cl. ........................................................ 379/44
(58) Field of Search ........................... 349/44, 110, 111; 257/59, 72

(56) References Cited

U.S. PATENT DOCUMENTS 6,091,467 A * 7/2000 Kubo et al. .................... 349/44

* cited by examiner

*Primary Examiner*—James Dudek
(74) *Attorney, Agent, or Firm*—Morgan, Lewis & Bockius LLP

(57) ABSTRACT

A liquid crystal display panel is disclosed, which includes a substrate, a gate line on the substrate at a constant distance in one direction, a data line, source/drain electrodes, and a storage electrode arranged to cross the gate line at a constant distance, a first contact hole in the drain electrode, a pixel electrode connected with the drain electrode through the first contact hole in a pixel region, and a first pattern below the first contact hole to shield light.

4 Claims, 6 Drawing Sheets

라이트(Light)

라이트(Light)

LIQUID CRYSTAL DISPLAY PANEL AND METHOD FOR FABRICATING THE SAME

This application claims the benefit of Korean Patent Application No. P2000-0085556, filed in Korea on Dec. 29, 2000, which is hereby incorporated by reference.

BACKGROUND OF THE INVENTION

1. Field of the Invention

The present invention relates to a liquid crystal display (LCD) panel and a method for fabricating the same. More particularly, the present invention relates to a LCD panel and a method for fabricating the same in which light leakage resulting from a rubbing defect is prevented from occurring in a contact hole during a rubbing process.

2. Background of the Related Art

A related art LCD panel will be described with reference to the accompanying drawings.

FIG. 1 is a perspective view of the related art LCD panel, in which a unit pixel region of the LCD panel is shown. FIG. 2A is a sectional view taken along line I–I' of FIG. 1. FIG. 2B is a sectional view taken along line II–II' of FIG. 1.

FIG. 3A is a detailed sectional view showing a portion "A" of FIG. 2A. FIG. 3B is a detailed sectional view showing a portion "B" of FIG. 2B.

As shown in FIG. 1, in the related art LCD panel, a gate line 11 is arranged on a first substrate (transparent substrate) 10, crossing a data line 15 defining a pixel region. A pixel electrode 17 made of a transparent conductive film is formed in each pixel region. A thin film transistor (TFT) is formed in each pixel region by switching a signal of the gate line 11 to the data line 15 to the pixel electrode 17.

The TFT includes a gate electrode 11a projecting from the gate line 11 on the first substrate 10. A semiconductor film 13 is formed below the data line 15 and in a TFT region. Then, a source electrode 15a is formed on the semiconductor film 13 to be connected with the data line 15 and to be overlapped with the gate electrode 11a. A drain electrode 15b is formed on the semiconductor film 13 opposite to the source electrode 15a to overlap the gate electrode 11a, and connected with the pixel electrode 17 through a contact hole 18a.

Also, a storage electrode 15c is formed on the gate line 11 to overlap the gate line 11, and is connected with the pixel electrode 17 through a contact hole 18b.

In a second substrate (not shown), a light-shielding film (not shown) is formed above the gate line 11, the data line 15, and the TFT to prevent light from leaking in the gate line 11, the data line 15, and the TFT.

A method for fabricating the aforementioned related art LCD panel will be described as follows.

As shown in FIG. 2A and FIG. 2B, the gate line 11 and the gate electrode 11a are simultaneously formed on the first substrate 10.

A gate insulating film 12 is formed on an entire surface of the first substrate to cover the gate electrode 11a and the gate line 11. Then, the semiconductor film 13 and an ohmic contact film 14 are formed on the gate insulating film 12.

Subsequently, a metal is deposited on the entire surface of the first substrate 10, and then patterned to form the data line 15 perpendicular to the gate line 11. The source and drain electrodes 15a and 15b are simultaneously formed with the data line 15, and the storage electrode 15c is formed above the gate line 11 at the same time. Then, a passivation film 16 is formed on the resulting structure.

The passivation film 16, the drain electrode 15b, the ohmic contact film 14, the semiconductor film 13, and the gate insulating film 12 are etched in a predetermined portion of the drain electrode 15b, thereby forming the contact hole 18a. Also, the passivation film 16, the storage electrode 15c, and the gate insulating film 12 are selectively removed in a predetermined portion of the storage electrode 15c, forming the second contact hole 18b. Then, the pixel electrode 17 is respectively connected with the drain and storage electrodes 15b and 15c in the pixel region.

If a voltage is applied between the pixel electrode 17 and a common electrode (not shown) to drive the LCD panel, an arrangement of molecules in a liquid crystal film is changed due to the voltage. To keep a constant arrangement of the molecules during a unit frame, a constant voltage applied to the liquid crystal film is required. Accordingly, the storage electrode 15c and the gate line 11 form a storage capacitor keeping the applied voltage to the liquid crystal molecules consistent.

Although not shown, an alignment film is deposited on the entire surface of the substrate, and rubbed to determine a direction of the molecules in the liquid crystal film.

However, the related art LCD panel has the following problems.

First, during rubbing, defects occur on the alignment of the molecules above the first and second contact holes. Accordingly, back light formed at the rear of the first substrate 10 passes through a portion that is defectively rubbed, causing light leakage.

Secondly, in a structure using an overcoat film (flattening film) of organic insulating film such as passivation film 16, high step coverage occurs at the first/second contact holes 18a and 18b. That is, the alignment film is not completely formed in the contact holes during the rubbing process. Thus, resulting in randomly arranged liquid crystals in the portions where the contact holes are formed, during driving of the panel. Therefore, light leakage occurs as the back light passes through the contact holes.

SUMMARY OF THE INVENTION

Accordingly, the present invention is directed to a liquid crystal display panel and a method for fabricating the same that substantially obviate one or more problems due to limitations and disadvantages of the related art.

An object of the present invention is to provide a liquid crystal display panel and a method for fabricating the same in which a metal film is simultaneously formed with a gate line in a lower portion of contact holes. The contact holes being formed to respectively connect a storage electrode and a drain electrode with pixel electrodes, thus preventing light from leaking in the contact holes due to a rubbing defect.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these aspects and other advantages and in accordance with the purpose of the present invention, as embodied and broadly described herein, an LCD panel of the present invention includes a substrate, a gate line on the substrate at a constant distance in one direction, a data line, source/drain electrodes, and a storage electrode arranged to cross the gate line at a constant distance. Additionally, the present invention includes a first contact hole in the drain electrode, a pixel electrode connected with the drain electrode through the first contact hole in a pixel region, and a first pattern below the first contact hole to shield light.

Preferably, the LCD panel further includes a storage electrode formed on the gate line to overlap the gate line, a second contact hole in the storage electrode, and a second pattern formed below the second contact hole to connect the pixel electrode with the storage electrode and to shield light.

Preferably, the first and second patterns are formed of the same material as that of the gate line.

In another aspect of the present invention, a method for fabricating an LCD panel includes forming a gate line having gate electrodes on a substrate, and simultaneously forming a pattern in a portion where a drain electrode of a TFT is connected with a pixel electrode, forming a gate insulating film on an entire surface of the first substrate, forming an active film on the gate insulating film above the gate electrode, forming a data line on the gate insulating film perpendicular to the gate line so that source/drain electrodes are arranged at both sides of the active film, forming a passivation film on the entire surface of the first substrate, forming a contact hole in the drain electrode above the pattern, and forming a pixel electrode connected with the drain electrode through the contact hole in a pixel region.

Preferably, the contact hole is formed by etching the drain electrode, the active film, and the gate insulating film to expose a surface of the pattern.

In another aspect according to the first embodiment of the present invention, a method includes forming a gate line having gate electrodes on a substrate, and simultaneously forming first and second patterns, respectively, in a portion where a drain electrode of a TFT is connected with a pixel electrode and a portion where a storage electrode is connected with the pixel electrode, forming a gate insulating film on an entire surface of the first substrate, forming an active film on the gate insulating film above the gate electrode, forming a data line on the gate insulating film in perpendicular to the gate line so that source/drain electrodes are arranged at both sides of the active film, and simultaneously a storage electrode above the second pattern to overlap the gate line, forming a passivation film on the entire surface of the first substrate, respectively forming first and second contact holes in the drain and storage electrodes above the first and second patterns, and forming a pixel electrode connected with the drain and storage electrodes through the first and second contact holes in a pixel region.

Preferably, the first contact hole is formed by etching the drain electrode, the active film, and the gate insulating film to expose the surface of the first pattern.

Preferably, the second contact hole is formed by etching the storage electrode and the gate insulating film to expose the surface of the second pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
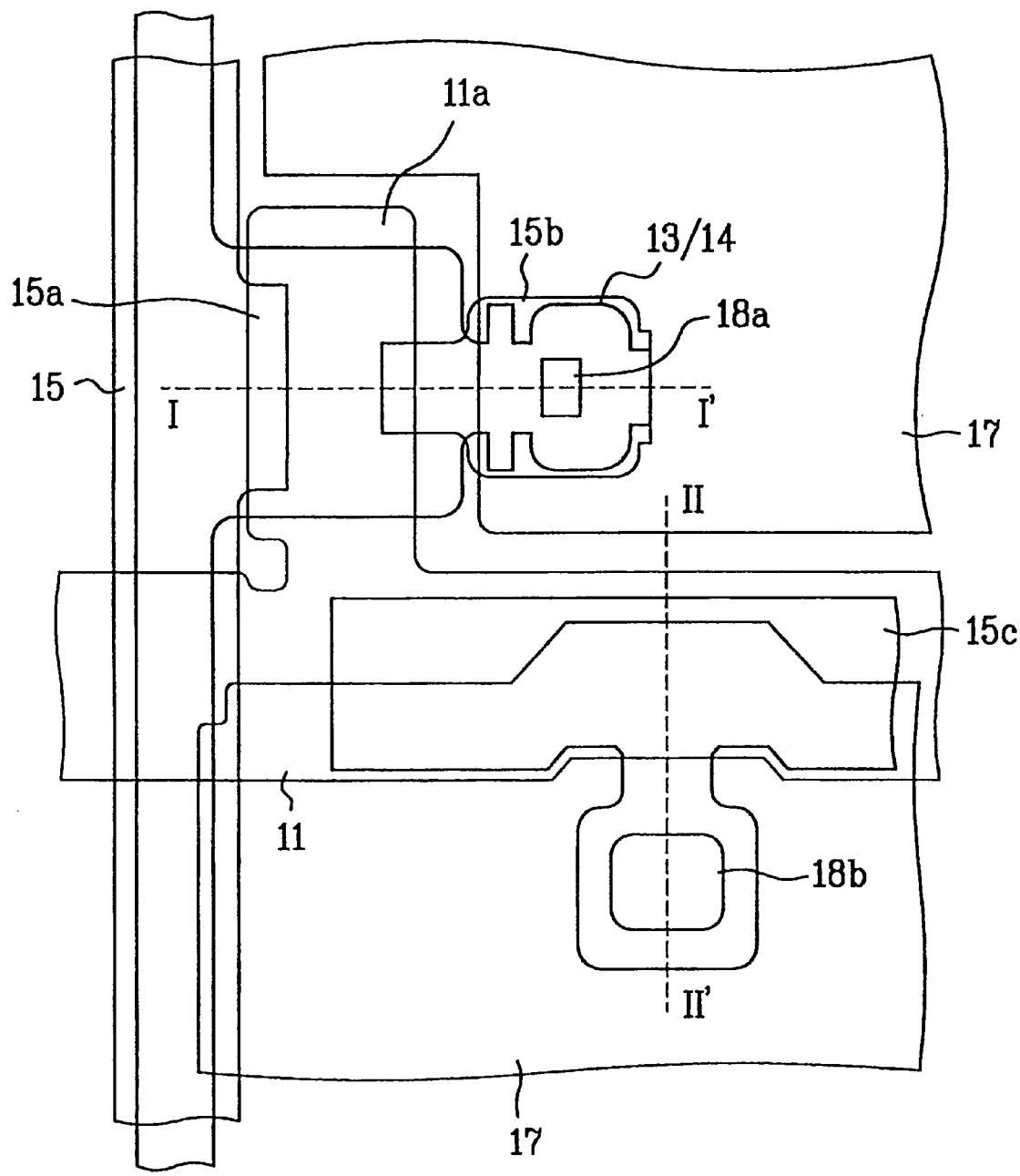
FIG. 1 is a perspective view of a first substrate of a related art LCD panel.
Figure 2A:
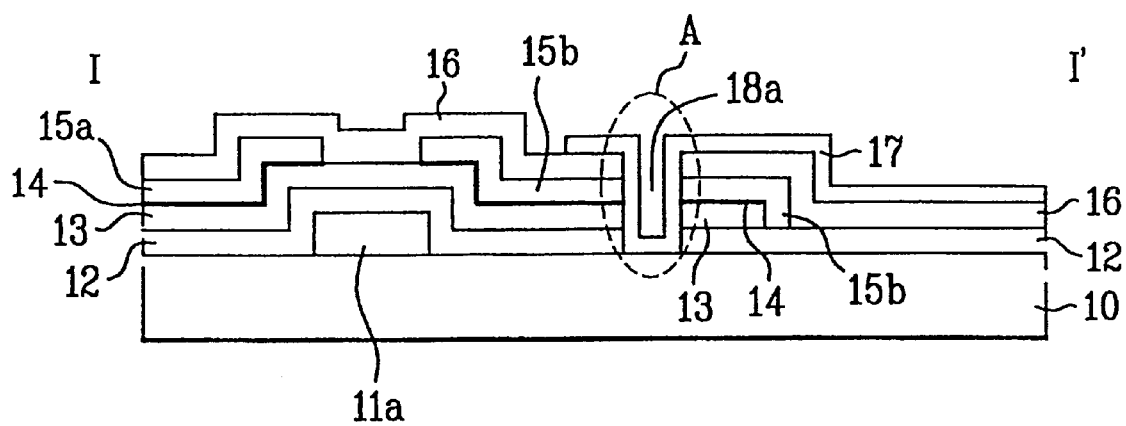
FIG. 2A is a sectional view taken along the line I–I' of FIG. 1.
Figure 2B:
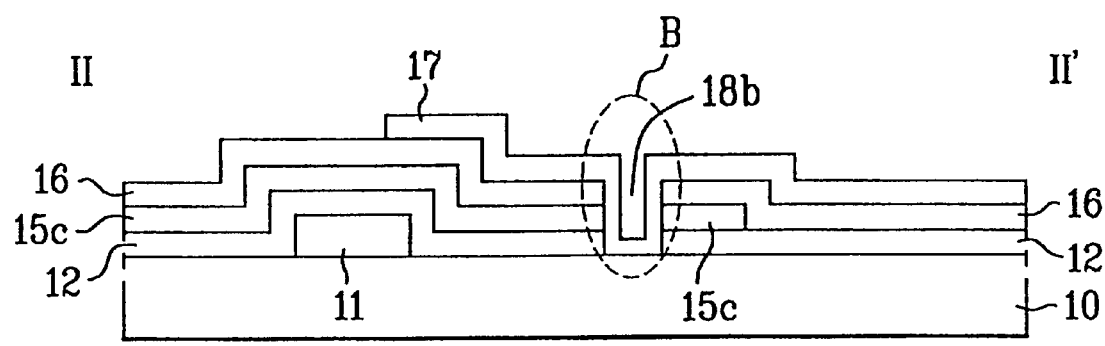
FIG. 2B is a sectional view taken along the line II–II' of FIG. 1.
Figure 3A:
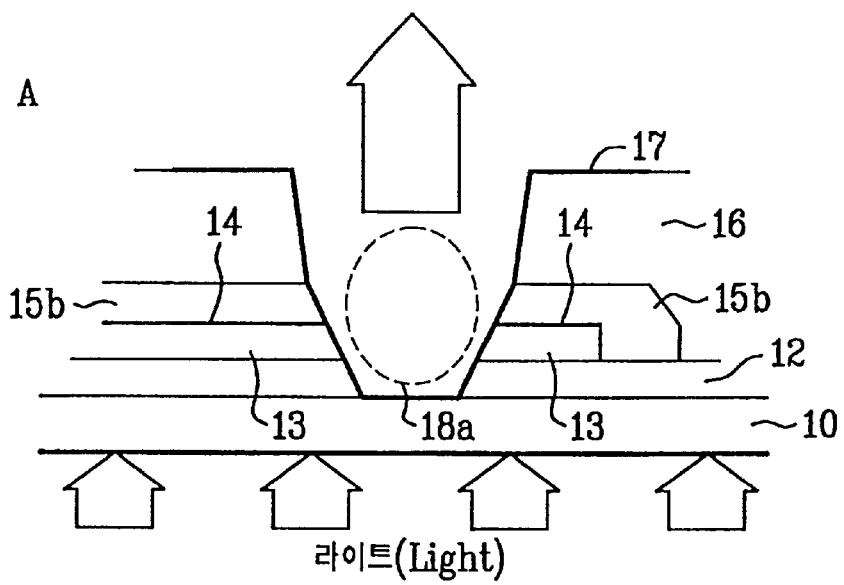
FIG. 3A is a detailed view showing a portion "A" of FIG. 3A.
Figure 3B:
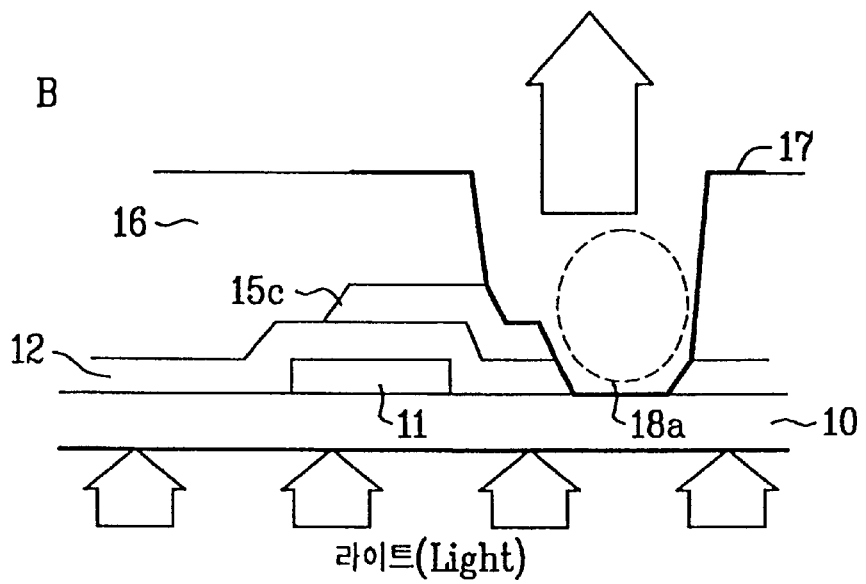
FIG. 3B is a detailed view showing a portion "B" of FIG. 2B.
Figure 4:
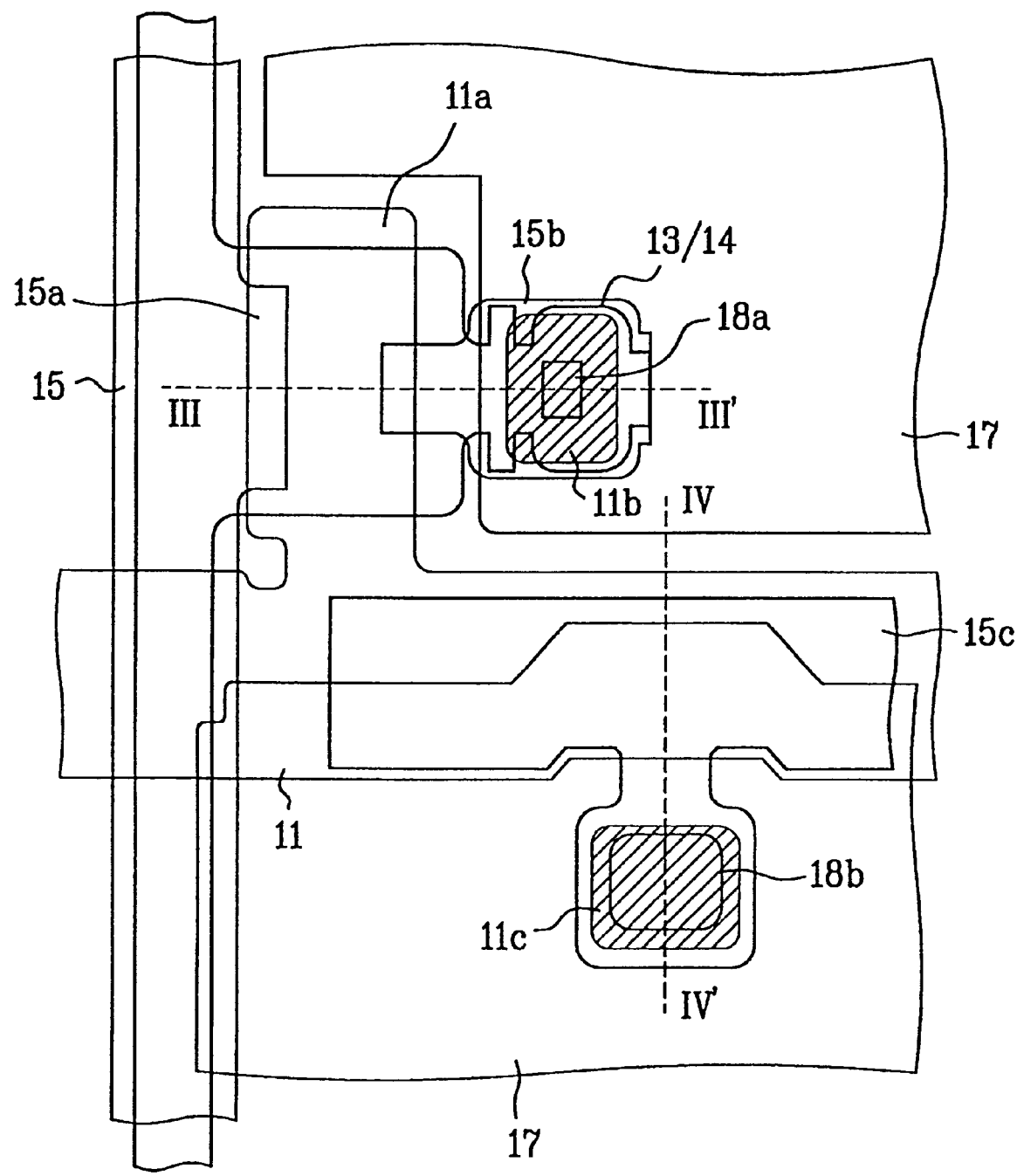
FIG. 4 is a perspective view of a first substrate according to the LCD panel of the present invention.
Figure 5A:
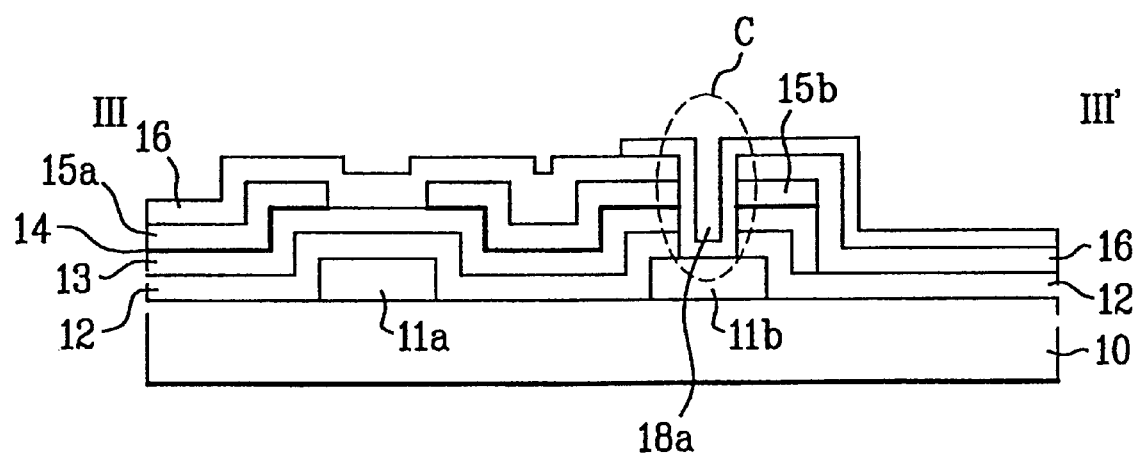
FIG. 5A is a sectional view taken along the line III–III' of FIG. 4.
Figure 5B:
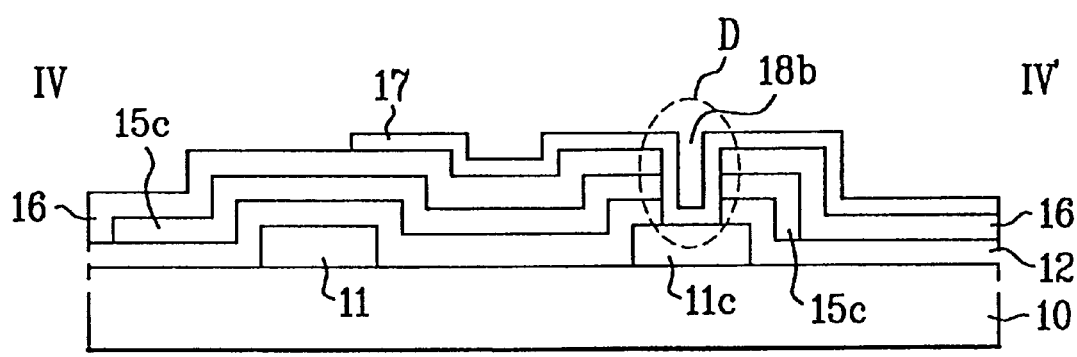
FIG. 5B is a sectional view taken along the line IV–IV' of FIG. 4.

FIG. 4 is a perspective view showing a first substrate according to the LCD panel of the present invention, which shows a unit pixel region. FIG. 5A and FIG. 5B are sectional views taken along line III–III' of FIG. 4, and FIG. 5B is a sectional view taken along line IV–IV' of FIG. 4.

Figure 6A:
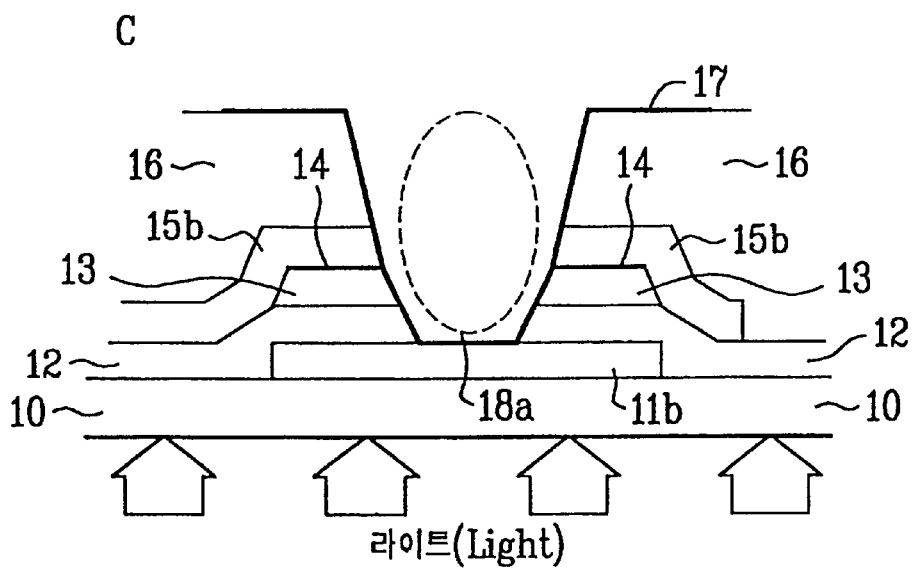
FIG. 6A is a detailed view showing a portion "C" of FIG. 5A.
Figure 6B:
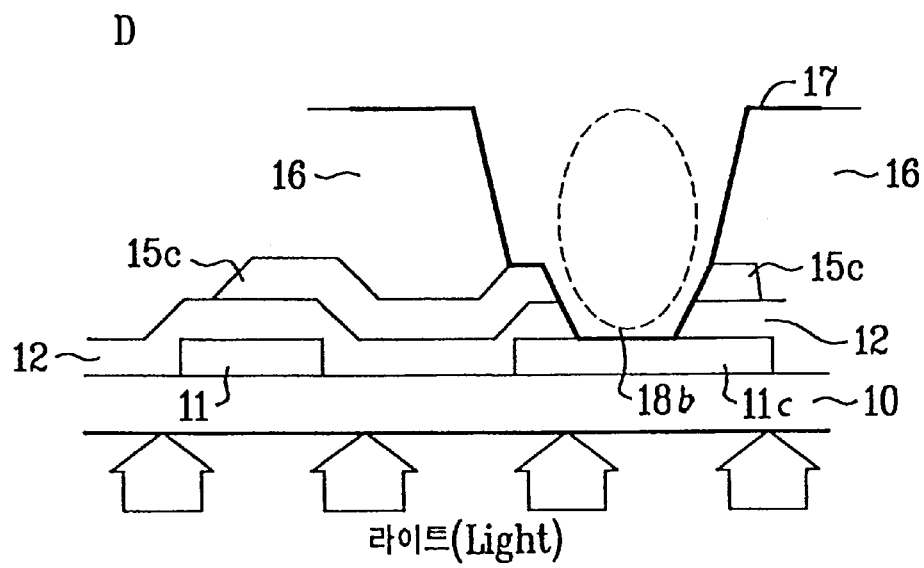
FIG. 6B is a detailed view showing a portion "D" of FIG. 5B.

FIG. 6A is a detailed view showing a portion "C" of FIG. 5A. FIG. 6B is a detailed view showing a portion "D" of FIG. 5B.

As shown in FIG. 4, in an embodiment of the LCD panel of the present invention, a gate line 11 is arranged on a first substrate 10 and crosses a data line 15 defining a pixel region. A pixel electrode 17 made of a transparent conductive film is formed in each pixel region. Then, a thin film transistor (TFT) is formed, which is switched by a signal applied by the gate line 11, to the data line 15, and to the pixel electrode 17.

The TFT includes a gate electrode 11a projecting from the gate line 11 on the first substrate 10. A semiconductor film 13 is formed below the data line 15 and in a TFT region. Then, a source electrode 15a is formed on the semiconductor film 13, to be connected with the data line 15 and to overlap the gate electrode 11a. A drain electrode 15b is formed on the semiconductor film 13, and connected with the pixel electrode 17 through a contact hole 18a.

Also, a storage electrode 15c is formed on the gate line 11, and connected with the pixel electrode 17 through a contact hole 18b.

Such first and second patterns 11b and 11c are formed of the same material as that of the gate line 11. The first and second patterns are formed on the first substrate 10 and below the first and second contact holes 18a and 18b, thus preventing light from leaking.

In a second substrate (not shown), a light-shielding film (not shown) is formed above the gate line 11, the data line 15, and the TFT to prevent light from leaking in the gate line 11, the data line 15, and the TFT.

An embodiment of a method for fabricating the LCD panel of the present invention will be described as follows.

As shown in FIG. 5A and FIG. 5B, a metal film is deposited on the first substrate 10, and then selectively removed to form the gate line 11, having the gate electrode 11a. Simultaneously first and second patterns 11b and 11c are formed, in portions where the first and second contact holes 18a and 18b are to be formed, as shown in FIG. 4.

A gate insulating film 12 is formed on an entire surface of the first substrate to cover the gate electrode 11a, the gate line 11, and the first and second patterns 11b and 11c.

Then, the semiconductor film 13 and an ohmic contact film 14 are formed on the gate insulating film 12.

Subsequently, a metal is deposited on the entire surface of the first substrate 10, and patterned to form the data line 15 perpendicular to the gate line 11. At the same time, the storage electrode 15c is formed over the source and drain electrodes 15a and 15b and the gate line 11. Then, the ohmic contact film 14 between the source and drain electrodes 15a and 15b is removed, and a passivation film 16 is formed on the entire surface.

The passivation film 16, the drain electrode 15b, the ohmic contact film 14, the semiconductor film 13, and the gate insulating film 12 are etched in a predetermined portion of the drain electrode 15b to expose the first pattern 11b, thereby forming the contact hole 18a. Also, the second contact hole 18b is formed by selectively removing the passivation film 16, the storage electrode 15c, and the gate insulating film 12 in a predetermined portion of the storage electrode 15c to expose the second pattern 11c. Then, the pixel electrode 17 is respectively connected with the drain and storage electrodes 15b and 15c in the pixel region.

It is possible to selectively remove the passivation film 16 during the formation of the first and second contact holes 18a and 18b to expose the drain and storage electrodes 15b and 15c.

Although not shown, an alignment film is deposited on the entire surface of the substrate, and rubbed to determine a direction of the molecules in the liquid crystal film. At this time, a defect may occur on the alignment due to the first and second contact holes 18a and 18b.

However, as shown in FIG. 6A and FIG. 6B, the first and second patterns 11b and 11c are respectively formed below the first and second contact holes 18a and 18b. Therefore, even though a back light is irradiated from the rear of the first substrate 10, the first and second patterns 11b and 11c serve to shield the back light. That is, light leakage resulting from a defect rubbing of the alignment film does not occur.

In the above embodiment, the first and second patterns are formed. However, it is possible to form only the first pattern, when the storage electrode is formed only on the gate line (the second contact hole is formed on the gate line).

As aforementioned, the LCD panel and the method for fabricating the same according to the present invention have at least the following advantages.

In a structure using an overcoat film (flattening film) of organic insulating film, high step coverage occurs at the contact holes. That is, the alignment film may not be completely formed on the contact holes. However, the first and second patterns shield the back light, so that it is possible to prevent light from being leaked in the contact holes.

It will be apparent to those skilled in the art that various modifications and variations can be made in the liquid crystal display panel of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) panel comprising:

a substrate;

a gate line on the substrate at a constant distance in one direction;

a data line, a source electrode, a drain electrode, and a storage electrode arranged to cross the gate line at a constant distance;

a first contact hole in the drain electrode;

a pixel electrode connected with the drain electrode through the first contact hole in a pixel region; and a first pattern situated below the first contact hole to shield light.

2. The LCD panel as claimed in claim 1, further comprising:

a storage electrode formed on the gate line to overlap the gate line;

a second contact hole in the storage electrode; and a second pattern formed below the second contact hole to connect the pixel electrode with the storage electrode and to shield light.

3. The LCD panel as claimed in claim 2, wherein the second pattern is formed of the same material as that of the gate line.

4. The LCD panel as claimed in claim 1, wherein the first pattern is formed of the same material as that of the gate line.

* * * * *